United States Patent
Moniz et al.

(10) Patent No.: US 10,371,063 B2
(45) Date of Patent: Aug. 6, 2019

(54) TURBINE ENGINE AND METHOD OF COOLING THEREOF

(71) Applicant: General Electric Company, Schenectady, NY (US)

(72) Inventors: Thomas Ory Moniz, Loveland, OH (US); Jeff Glover, Cincinnati, OH (US); Joseph Rose, Mason, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 15/363,530

(22) Filed: Nov. 29, 2016

(65) Prior Publication Data

US 2018/0149093 A1     May 31, 2018

(51) Int. Cl.
| | |
|---|---|
| *F02C 9/18* | (2006.01) |
| *F02C 3/04* | (2006.01) |
| *F02C 7/18* | (2006.01) |
| *F01D 25/24* | (2006.01) |
| *F02K 3/06* | (2006.01) |
| *F01D 21/12* | (2006.01) |
| *F01D 25/14* | (2006.01) |

(52) U.S. Cl.
CPC ............... *F02C 9/18* (2013.01); *F01D 21/12* (2013.01); *F01D 25/14* (2013.01); *F01D 25/24* (2013.01); *F02C 3/04* (2013.01); *F02C 7/18* (2013.01); *F02K 3/06* (2013.01); *F05D 2220/32* (2013.01); *F05D 2260/20* (2013.01); *F05D 2270/112* (2013.01); *F05D 2270/52* (2013.01); *Y02T 50/675* (2013.01)

(58) Field of Classification Search
None
See application file for complete search history.

(56) References Cited

U.S. PATENT DOCUMENTS

| | | |
|---|---|---|
| 2,031,541 A | 2/1936 | MacClain |
| 8,210,801 B2 | 7/2012 | Ballard, Jr. et al. |
| 2009/0297342 A1 | 12/2009 | Laborie |
| 2013/0098047 A1* | 4/2013 | Suciu ................. F02C 7/08 60/772 |
| 2013/0283762 A1 | 10/2013 | Simpson et al. |

(Continued)

OTHER PUBLICATIONS

International Search Report and Written Opinion issued in connection with corresponding PCT Application No. PCT/US2017/056464 dated Jan. 29, 2018.

(Continued)

*Primary Examiner* — Thomas G Black
*Assistant Examiner* — Demetra R Smith-Stewart
(74) *Attorney, Agent, or Firm* — General Electric Company; James Reed

(57) ABSTRACT

A turbine engine including a core engine cowl including a compartment, a cooling airflow source positioned within the compartment, and a full authority digital engine control (FADEC) system coupled in communication with the cooling airflow source. The FADEC system is configured to determine a flight status of the turbine engine, and actuate the cooling airflow source when the turbine engine is not in flight, and before the turbine engine has been shut down, such that heat is exhausted from the compartment.

17 Claims, 5 Drawing Sheets

(56) References Cited

U.S. PATENT DOCUMENTS

| | | |
|---|---|---|
| 2015/0252683 A1 | 9/2015 | Hasting et al. |
| 2015/0267616 A1 | 9/2015 | Versuex |
| 2016/0123185 A1 | 5/2016 | Le Pache et al. |
| 2017/0191419 A1* | 7/2017 | Bayraktar .................. F02C 7/18 |
| 2017/0234224 A1* | 8/2017 | Adibhatla ................. F02C 7/12 60/226.1 |
| 2017/0342855 A1* | 11/2017 | Hon ........................ F01D 19/02 |
| 2017/0370291 A1* | 12/2017 | Rambo .................... F02C 7/18 |
| 2018/0128178 A1* | 5/2018 | Snape ....................... F02C 6/08 |

OTHER PUBLICATIONS

Moniz, T.O., et al., Turbine engine and method of cooling thereof, GE co-pending U.S. Appl. No. 15/363,569, filed Nov. 29, 2016.

\* cited by examiner

TURBINE ENGINE AND METHOD OF COOLING THEREOF

BACKGROUND

The present disclosure relates generally to turbine engines and, more specifically, to cooling systems for cooling compartments and components of turbine engines after shutdown.

Gas turbine engines typically include an undercowl space or engine core compartment as a part of the engine architecture. As gas turbine engines are improved to, for example, provide higher aircraft speed or lower specific fuel consumption (SFC), pressure ratios of fans and compressors and internal temperatures are expected to rise substantially, resulting in higher temperature for the engine core compartment and components. Engine core compartment components include electronics and other line replaceable units (LRUs). In addition, other known electronic components, including full authority digital engine control (FADEC) systems, may be particularly sensitive to increasing engine core compartment temperatures both during gas turbine engine operation and as a result of soak-back after engine shutdown. The high temperatures can have undesirable effects on and result in a reduced service life of the electrical and electronic components in the undercowl space.

BRIEF DESCRIPTION

In one aspect, a turbine engine is provided. The turbine engine includes a core engine cowl including a compartment, a cooling airflow source positioned within the compartment, and a full authority digital engine control (FADEC) system coupled in communication with the cooling airflow source. The FADEC system is configured to determine a flight status of the turbine engine, and actuate the cooling airflow source when the turbine engine is not in flight, and before the turbine engine has been shut down, such that heat is exhausted from the compartment.

In another aspect, a cooling system for use within a core engine cowl of a turbine engine is provided. The cooling system includes a cooling fan positioned within a compartment of the core engine cowl, and a full authority digital engine control (FADEC) system coupled in communication with the cooling fan. The FADEC system is configured to determine a flight status of the turbine engine, and actuate the cooling fan when the turbine engine is not in flight, and before the turbine engine has been shut down, such that heat is exhausted from the compartment.

In yet another aspect, a method of cooling a turbine engine is provided. The method includes determining a flight status of the turbine engine, and actuating, via full authority digital engine control (FADEC) system control, a cooling fan when the turbine engine is not in flight, and before the turbine engine has been shut down. The cooling fan is positioned within a compartment of a core engine cowl such that heat is exhausted from the compartment.

DRAWINGS

These and other features, aspects, and advantages of the present disclosure will become better understood when the following detailed description is read with reference to the accompanying drawings in which like characters represent like parts throughout the drawings, wherein.

Figure 1:
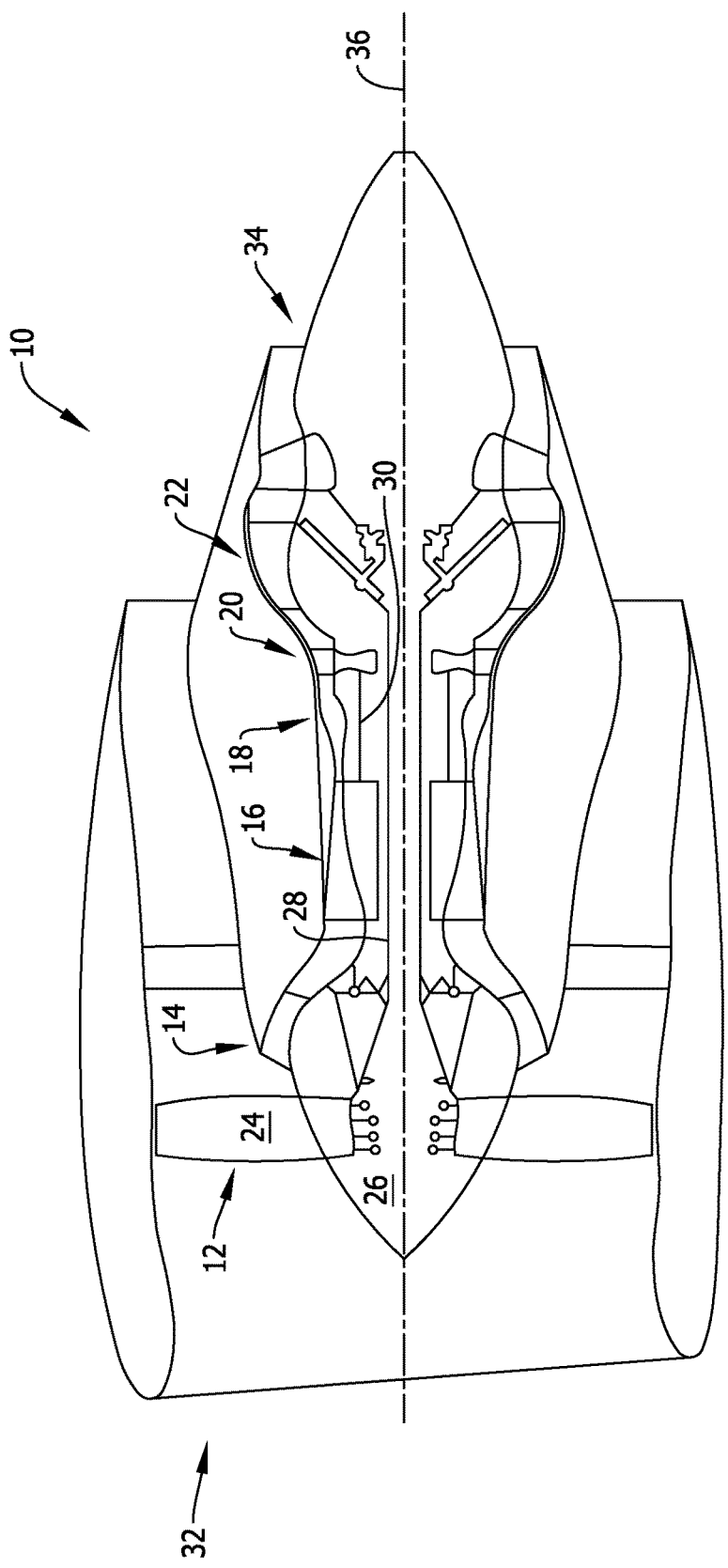
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to cooling systems for cooling compartments and components of turbine engines after shutdown. More specifically, the cooling system describes herein includes an auxiliary fan positioned within a core engine cowl of a turbine engine that facilitates exhausting heat therefrom. The auxiliary cooling fan is actuated via full authority digital engine control (FADEC) system control, and is operable for cooling under the core engine cowl after turbine engine shutdown. As such, the core engine cowl, including core-mounted accessories and electronics such as the FADEC system, remains cool even in the presence of thermal soak back after engine shutdown, such that the service life of the accessories is increased.

While the following embodiments are described in the context of a turbofan engine, it should be understood that the systems and methods described herein are also applicable to turboprop engines, turboshaft engines, turbojet engines, ground-based turbine engines, and any other turbine engine or machine that compresses working fluid and where cooling after shutdown is desired.

FIG. 1 is a schematic diagram of an exemplary turbine engine 10 including a fan assembly 12, a low-pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine assembly 20 coupled in flow communication with combustor assembly 18 and a low-pressure turbine assembly 22. Fan assembly 12 includes an array of fan blades 24 extending radially outward from a rotor disk 26. Low-pressure turbine assembly 22 is coupled to fan assembly 12 and booster compressor assembly 14 through a first drive shaft 28, and high-pressure turbine assembly 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbine assemblies 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbine engine 10 via exhaust 34.

Figure 2:
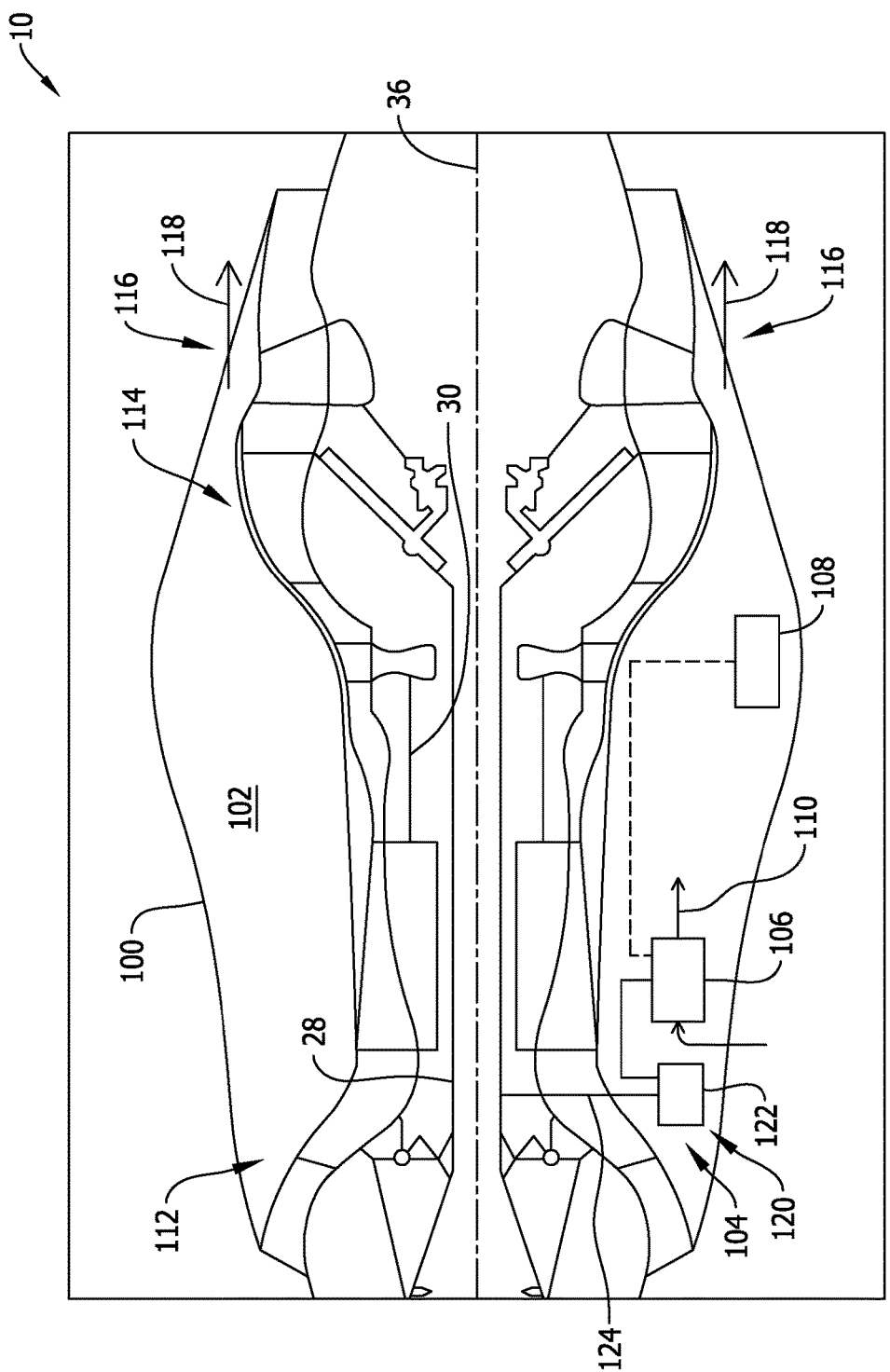
FIG. 2 is a schematic illustration of a portion of the turbine engine shown in FIG. 1, in accordance with a first embodiment of the disclosure.

FIG. 2 is a schematic illustration of a portion of turbine engine 10 (shown in FIG. 1), in accordance with a first embodiment of the disclosure. In the exemplary embodiment, turbine engine 10 further includes a core engine cowl 100 having a hollow compartment 102 that houses one or more mechanical or electronic components therein. For example, in one embodiment, a cooling system 104 is positioned within hollow compartment 102. Cooling system 104 includes a cooling airflow source, such as at least one cooling fan 106 positioned within hollow compartment 102, and a full authority digital engine control (FADEC) system 108 coupled in communication with cooling fan 106. FADEC system 108 is coupled, either by wired or wirelessly connectivity, in communication with one or more subsystems or components of turbine engine 10 and cooling system 104 to control the operation of turbine engine 10 and cooling system 104 at a predetermined stage of operation of turbine engine 10, as will be explained in more detail below.

In the exemplary embodiment, cooling fan 106 is positioned within hollow compartment 102 such that cooling airflow 110 is circulated within hollow compartment 102 in a manner that facilitates enhancing the cooling efficiency of cooling airflow 110. For example, hollow compartment 102 includes a forward portion 112 and a rearward portion 114 axially relative to centerline 36. In addition, core engine cowl 100 includes a vent 116 defined therein that exhausts heat and, more specifically, heated airflow 118 from hollow compartment 102. Vent 116 is positioned at rearward portion 114 of hollow compartment 102. In one embodiment, cooling fan 106 is positioned within forward portion 112 of hollow compartment 102, and oriented to discharge cooling airflow 110 towards rearward portion 114 such that heated airflow 118 is exhausted from vent 116. Cooling fan 106 is also positioned within hollow compartment 102 at a 6 o'clock position when turbine engine 10 is viewed axially relative to centerline 36, such that cooling fan 106 is efficiently positioned for supplementing the motive force of rising heat within hollow compartment 102.

Moreover, in one embodiment, cooling fan 106 is further oriented such that cooling airflow 110 discharged from cooling fan 106 flows helically relative to centerline 36 of turbine engine 10. More specifically, cooling fan 106 is oriented obliquely relative to centerline 36 in one or more dimensions such that cooling airflow 110 swirls about centerline 36 from forward portion 112 towards rearward portion 114 before being discharged from vent 116 as heated airflow 118. As such, cooling fan 106 is positioned and oriented such that a volume of hollow compartment 102 is capable of being cooled with a device located at a fixed position within hollow compartment 102. In an alternative embodiment, more than one cooling fan 106 is positioned within hollow compartment 102.

In operation, FADEC system 108 determines a flight status of turbine engine 10, to determine if turbine engine 10 is on the ground and airflow through turbine engine 10 is limited, and actuates cooling fan 106 such that heat is exhausted from hollow compartment 102. More specifically, FADEC system 108 actuates cooling fan 106 when turbine engine 10 is not in flight, and before turbine engine 10 has been shut down. As such, cooling airflow 110 is provided by an auxiliary device (i.e., cooling fan 106) that operates independently of any bleed air cooling system that operates during operation of turbine engine 10. For example, FADEC system 108 determines the flight status of turbine engine 10 based on at least an altitude of turbine engine 10 and the associated airframe, the air density of an ambient environment, a throttle lever position, an operating position of a landing gear, and engine operating parameters. In addition, actuating cooling fan 106 before turbine engine shutdown facilitates FADEC system control of cooling fan 106 without the use of a supplemental control device. For example in one embodiment, FADEC system 108 transmits a start signal to cooling fan 106 before executing an engine shutdown sequence, which subsequently results in shutdown of FADEC system 108.

Cooling fan 106 is configured to operate for a preset time after turbine engine 10 has been shut down. For example, in the exemplary embodiment, cooling fan 106 includes a timer device 120 that shuts down cooling fan 106 at a time after actuation of cooling fan 106. Timer device 120 operates independent of FADEC system control such that cooling fan 106 is operable after turbine engine shutdown. In one embodiment, timer device 120 is a flywheel 122 that stores energy during turbine engine operation, and that uses the energy to power cooling fan 106 for a limited time after turbine engine shutdown. More specifically, as shown in FIG. 2, a flywheel shaft 124 is coupled between first drive shaft 28 and flywheel 122 such that rotational energy is induced to flywheel 122 as first drive shaft 28 rotates. Alternatively, flywheel shaft 124 is coupled to any rotating component of turbine engine 10 that enables cooling system 104 to function as described herein.

Figure 3:
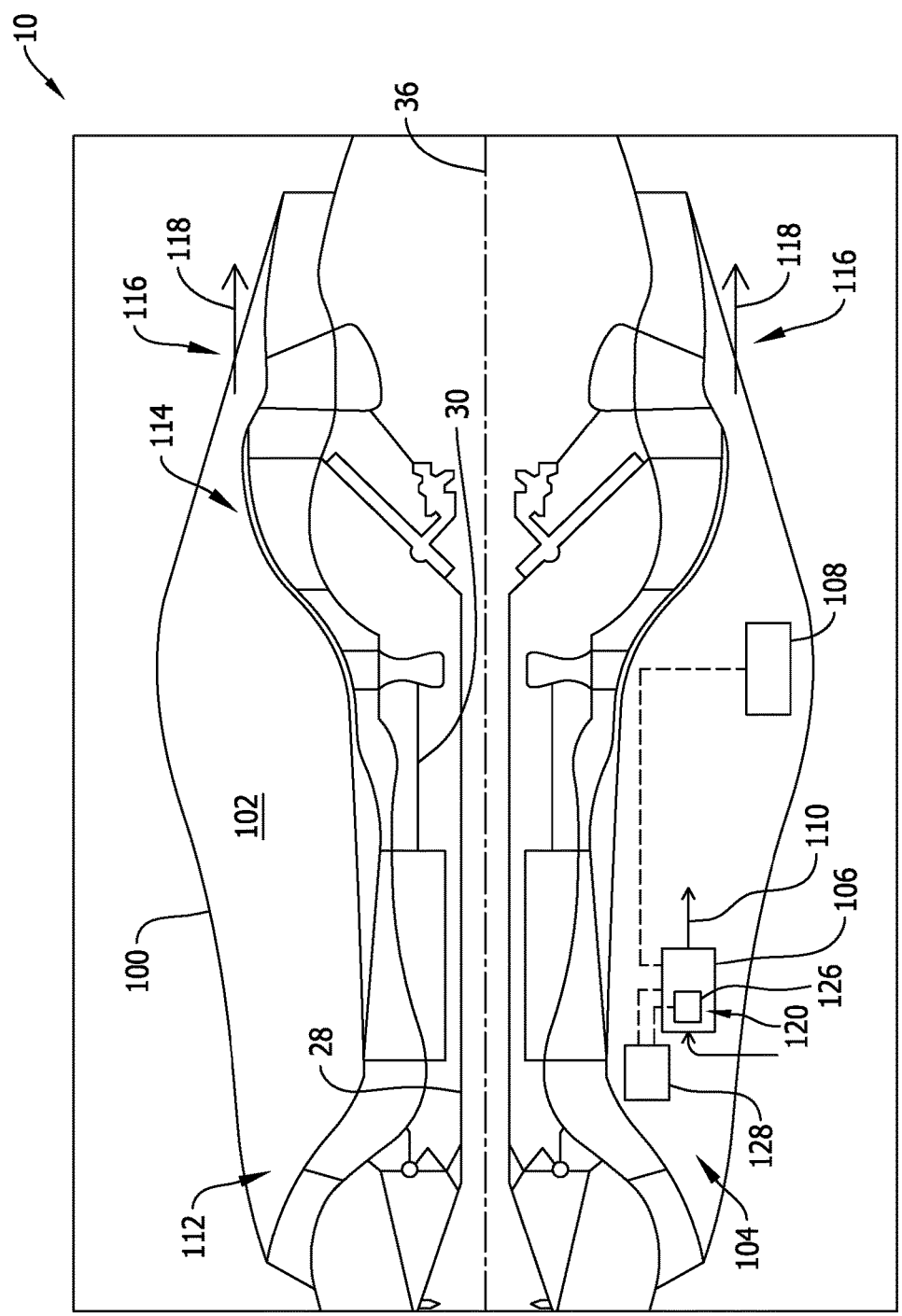
FIG. 3 is a schematic illustration of a portion of the turbine engine shown in FIG. 1, in accordance with a second embodiment of the disclosure.

FIG. 3 is a schematic illustration of a portion of turbine engine 10 (shown in FIG. 1), in accordance with a second embodiment of the disclosure. In the exemplary embodiment, as described above, cooling fan 106 is configured to operate for a preset time after turbine engine 10 has been shut down. For example, cooling fan 106 includes timer device 120 that shuts down cooling fan 106 at a time after actuation of cooling fan 106. In one embodiment, timer device 120 is an electronic timer 126 having an independent power supply 128. Independent power supply 128 enables electronic timer 126 to operate independent of FADEC system control. In some embodiments, independent power supply 128 also powers cooling fan 106 such that cooling fan 106 is operable after turbine engine shutdown.

Figure 4:
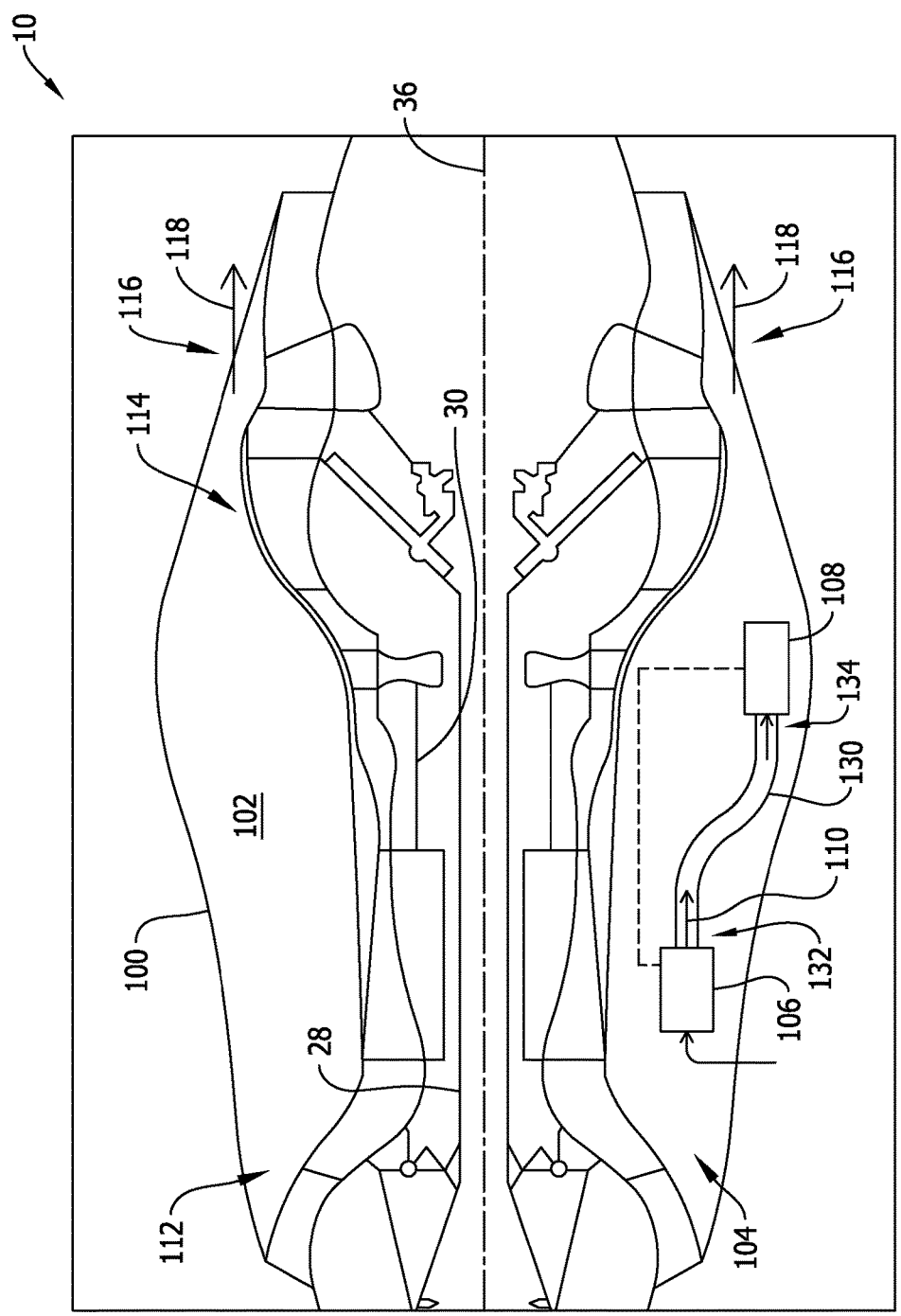
FIG. 4 is a schematic illustration of a portion of the turbine engine shown in FIG. 1, in accordance with a third embodiment of the disclosure.

FIG. 4 is a schematic illustration of a portion of turbine engine 10 (shown in FIG. 1), in accordance with a third embodiment of the disclosure. In the exemplary embodiment, cooling system 104 further includes an airflow conduit 130 extending from cooling fan 106. More specifically, airflow conduit 130 includes an inlet 132 and a discharge outlet 134. Airflow conduit 130 is oriented such that cooling airflow 110 is received at inlet 132, channeled through airflow conduit 130, and discharged towards predetermined high temperature regions within core engine cowl 100. For example, as described above, hollow compartment 102 houses one or more electronic components therein, such as FADEC system 108. As such, in the exemplary embodiment, discharge outlet 134 is positioned such that cooling airflow 110 is channeled towards FADEC system 108 in a more efficient and direct manner. In an alternative embodiment, only a portion of cooling airflow 110 discharged from cooling fan 106 is channeled through airflow conduit 130, and the remainder of cooling airflow 110 is discharged for general cooling of hollow compartment 102.

Figure 5:
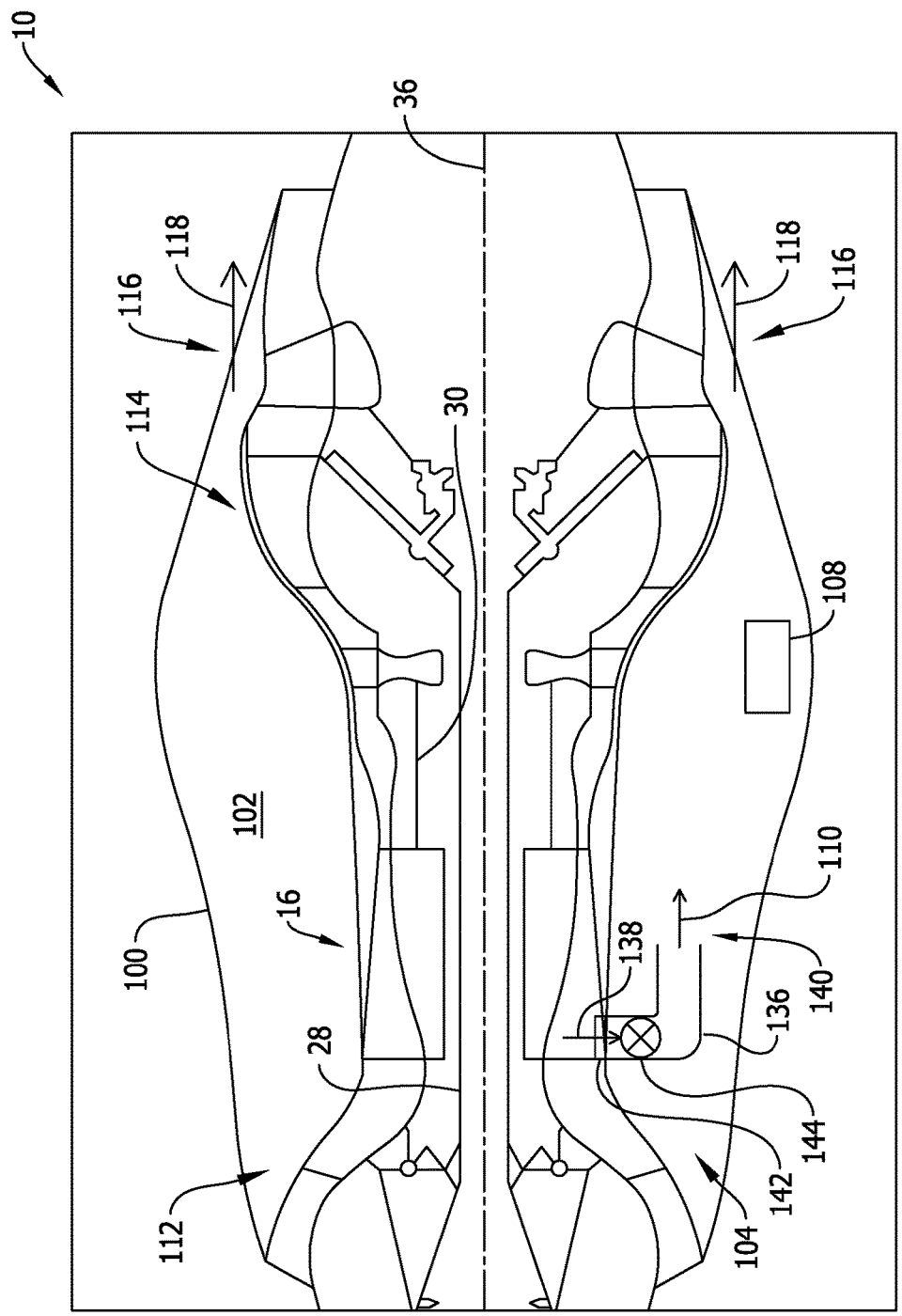
FIG. 5 is a schematic illustration of a portion of the turbine engine shown in FIG. 1, in accordance with a fourth embodiment of the disclosure.

FIG. 5 is a schematic illustration of a portion of turbine engine 10, in accordance with a fourth embodiment of the disclosure. In the exemplary embodiment, cooling system 104 includes a cooling airflow source, including a bypass conduit 136 that channels bleed air 138 into hollow compartment 102 from a source of bleed air, such as compressor 16. Bypass conduit 136 receives airflow from a source such as, but not limited to, fan assembly 12, low-pressure or booster compressor assembly 14, and high-pressure compressor assembly 16 (each shown in FIG. 1). Bypass conduit 136 includes a bleed air outlet 140 positioned within and that discharges cooling airflow 110 into hollow compartment 102. Cooling system 104 further includes at least one valve positioned between the source of bleed air and bleed air outlet 140. The at least one valve includes, but is not limited to, a variable bleed valve 142 and a stop valve 144 positioned within bypass conduit 136. FADEC system 108 controls actuation of one or both of variable bleed valve 142 and stop valve 144 when turbine engine 10 is at ground idle, such that bleed air 138 is channeled into hollow compartment 102 to facilitate cooling thereof.

An exemplary technical effect of the systems and methods described herein includes at least one of: (a) cooling under a core engine cowl of a turbine engine; (b) increasing the service life of core-mounted engine accessories; and (c) providing a cooling system that is operable after turbine engine shutdown.

Exemplary embodiments of a cooling system for use with a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan assemblies and related methods as described herein. Rather, the exemplary embodiment can be implemented and utilized in connection with many applications where cooling a hollow compartment is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a fan assembly;
   a core engine cowl comprising a compartment;
   a cooling fan positioned within said compartment aft of the fan assembly; and
   a full authority digital engine control (FADEC) system coupled in communication with said cooling fan, wherein said FADEC system is configured to:
   determine a flight status of the turbine engine; and
   actuate said cooling fan when the turbine engine is not in flight, and before the turbine engine has been shut down, such that heat is exhausted from said compartment, wherein said cooling fan comprises a timer device configured to shut down said cooling fan at a time after actuation of said cooling fan, said timer device configured to operate independent of FADEC system control.

2. The turbine engine in accordance with claim 1, wherein said compartment comprises a forward portion and a rearward portion, said cooling fan positioned within said forward portion and oriented such that airflow is channeled from said forward portion towards said rearward portion.

3. The turbine engine in accordance with claim 2, wherein said cooling fan is further oriented such that the airflow flows helically relative to a centerline of the turbine engine.

4. The turbine engine in accordance with claim 2, wherein said compartment is configured to house said FADEC system therein, the turbine engine further comprising an airflow conduit extending between said cooling fan and said FADEC system.

5. The turbine engine in accordance with claim 1, wherein said timer device comprises a flywheel configured to store energy during turbine engine operation, and configured to use the energy to power said cooling fan for a limited time after turbine engine shutdown.

6. The turbine engine in accordance with claim 1, wherein said timer device comprises an electronic timer having an independent power supply, said electronic timer configured to operate said cooling fan for a preset time after turbine engine shutdown.

7. The turbine engine in accordance with claim 1, wherein said cooling airflow source comprises:
a bypass conduit configured to channel bleed air into said compartment from a source of bleed air, said bypass conduit comprising a bleed air outlet positioned within said compartment; and
at least one valve positioned between the source of bleed air and said bleed air outlet, wherein said FADEC system is configured to control actuation of said at least one valve.

8. A cooling system for use within a core engine cowl of a turbine engine, said cooling system comprising:
a cooling fan positioned within a compartment of the core engine cowl aft of a fan assembly; and
a full authority digital engine control (FADEC) system coupled in communication with said cooling fan, wherein said FADEC system is configured to:
determine a flight status of the turbine engine; and
actuate said cooling fan when the turbine engine is not in flight, and before the turbine engine has been shut down, such that heat is exhausted from the compartment, wherein said cooling fan is configured to operate for a preset time after the turbine engine has been shut down.

9. The cooling system in accordance with claim 8 further comprising an airflow conduit extending from said cooling fan, said airflow conduit oriented to channel airflow from said cooling fan towards predetermined high temperature regions within the core engine cowl.

10. The cooling system in accordance with claim 8, wherein said cooling fan comprises a timer device configured to shut down said cooling fan at a time after actuation of said cooling fan, said timer device configured to operate independent of FADEC system control.

11. The cooling system in accordance with claim 10, wherein said timer device comprises a flywheel configured to store energy during turbine engine operation, and configured to use the energy to power said cooling fan for a limited time after turbine engine shutdown.

12. The cooling system in accordance with claim 10, wherein said timer device comprises an electronic timer having an independent power supply, said electronic timer configured operate said cooling fan for a preset time after turbine engine shutdown.

13. A method of cooling a turbine engine, said method comprising:
determining a flight status of the turbine engine; and
actuating, via full authority digital engine control (FADEC) system control, a cooling fan when the turbine engine is not in flight, and before the turbine engine has been shut down, wherein the cooling fan is positioned aft of a fan assembly within a compartment of a core engine cowl such that heat is exhausted from the compartment, and wherein actuating a cooling fan comprises operating the cooling fan for a preset time after the turbine engine has been shut down.

14. The method in accordance with claim 13, wherein actuating a cooling fan comprises transmitting a start signal from a FADEC system to the cooling fan.

15. The method in accordance with claim 14 further comprising operating the cooling fan independent of FADEC system control.

16. The method in accordance with claim 14, wherein actuating a cooling fan comprises operating the cooling fan for a preset time after receiving the start signal from the FADEC system.

17. The method in accordance with claim 14, wherein transmitting a start signal comprises transmitting the start signal before executing an engine shutdown sequence.

* * * * *